US012515086B2

(12) United States Patent
Dusing et al.

(10) Patent No.: US 12,515,086 B2
(45) Date of Patent: Jan. 6, 2026

(54) ANALYSIS AND CONTROL FOR FIRE SUPPRESSION SYSTEM

(71) Applicant: Fire Rover, LLC, Ferndale, MI (US)

(72) Inventors: Jeremy Douglas Dusing, Troy, MI (US); Peter John Marry, Commerce, MI (US)

(73) Assignee: Fire Rover LLC, Farmington Hills, MI (US)

( * ) Notice: Subject to any disclaimer, the term of this patent is extended or adjusted under 35 U.S.C. 154(b) by 796 days.

(21) Appl. No.: 17/655,953

(22) Filed: Mar. 22, 2022

(65) Prior Publication Data
US 2022/0305315 A1 Sep. 29, 2022

Related U.S. Application Data

(60) Provisional application No. 63/164,859, filed on Mar. 23, 2021.

(51) Int. Cl.
*A62C 37/40* (2006.01)
*A62C 37/36* (2006.01)
(Continued)

(52) U.S. Cl.
CPC .............. *A62C 37/40* (2013.01); *A62C 37/04* (2013.01); *A62C 37/50* (2013.01); *G08B 17/125* (2013.01); *H04N 7/181* (2013.01)

(58) Field of Classification Search
CPC ......... A62C 37/40; A62C 37/04; A62C 37/50; H04N 7/181
See application file for complete search history.

(56) References Cited

U.S. PATENT DOCUMENTS 5,379,676 A   1/1995 Profeta et al.
6,289,331 B1  9/2001 Pedersen et al.
(Continued)

FOREIGN PATENT DOCUMENTS

CN    108578959 A  *  9/2018  ............. A62C 37/04
KR   20110102038 A     9/2011
(Continued)

OTHER PUBLICATIONS

CN 108578959 including Translation (Year: 2020).*
(Continued)

*Primary Examiner* — Steven M Cernoch
(74) *Attorney, Agent, or Firm* — Honigman LLP; Andrew J. Boes

(57) ABSTRACT

A computer-implemented method that, when executed by data processing hardware, causes the data processing hardware to perform operations. These operations include receiving alarm signals associated with a thermal event, receiving thermal imaging data for the observation zone associated with the thermal event, evaluating the thermal imaging data to determine the location and/or the area of the thermal event within the observation zone. The operations also include obtaining a configuration record that includes configuration parameters for a retardant dispenser associated with the observation zone. Using the configuration parameters, the operations include instructing the dispenser to provide a retardant to the thermal event.

20 Claims, 9 Drawing Sheets

(51) Int. Cl.
*A62C 37/50* (2006.01)
*G08B 17/12* (2006.01)
*H04N 7/18* (2006.01)

(56) References Cited

U.S. PATENT DOCUMENTS

| | | |
|---|---|---|
| 6,975,225 B2 | 12/2005 | Privalov et al. |
| 7,271,704 B2 | 9/2007 | McSheffrey et al. |
| 8,606,373 B2 | 12/2013 | Lozier et al. |
| 8,714,466 B2 | 5/2014 | Trapp et al. |
| 9,573,008 B1 | 2/2017 | Fletcher |
| 10,512,809 B2 | 12/2019 | Gladstone et al. |
| 2004/0163827 A1 | 8/2004 | Privalov et al. |
| 2008/0215190 A1 | 9/2008 | Pillar et al. |
| 2009/0055486 A1 | 2/2009 | Chen |
| 2009/0301735 A1 | 12/2009 | Trapp |
| 2010/0023162 A1 | 1/2010 | Gresak et al. |
| 2011/0253397 A1 | 10/2011 | Combs et al. |
| 2014/0118143 A1 | 5/2014 | Monacos et al. |
| 2015/0375023 A1 | 12/2015 | Seliverstov et al. |
| 2016/0271434 A1 | 9/2016 | Dusing et al. |
| 2020/0121967 A1 † | 4/2020 | Gladstone |

FOREIGN PATENT DOCUMENTS

| | | |
|---|---|---|
| KR | 101553775 B1 | 9/2015 |
| WO | 98/07471 A2 | 2/1998 |
| WO | 99/52599 A1 | 10/1999 |
| WO | 2008/001409 A1 | 1/2008 |
| WO | 2009/129875 A1 | 10/2009 |
| WO | 2018235922 A1 | 12/2018 |
| WO | WO-2020021093 A1 | 1/2020 |

OTHER PUBLICATIONS

Australian Patent Office, 1st Examination Report for Application 2022241746 dated Jun. 4, 2024.
International Search Report and Written Opinion for Application No. PCT/US2022/021394 dated Aug. 29, 2022.
International Preliminary Report on Patentability with Written Opinion for Application PCT/US2022/021394 dated Oct. 5, 2023.
Australian Patent Office, 2nd Examination Report for Application 2022241746 dated Dec. 13, 2024.
Canadian Patent Office, Office Action for Application 3212611 dated, Mar. 4, 2025.

\* cited by examiner
† cited by third party

ANALYSIS AND CONTROL FOR FIRE SUPPRESSION SYSTEM

CROSS REFERENCE TO RELATED APPLICATIONS

This application claims priority under 35 U.S.C. § 119(e) to U.S. Provisional Application 63/164,859, filed on Mar. 23, 2021. The disclosure of this prior application is considered part of the disclosure of this application and is hereby incorporated by reference in its entirety.

TECHNICAL FIELD

The present disclosure relates, generally, to fire suppression systems and, more specifically, to a fire monitoring and suppression system.

BACKGROUND

Fire suppression systems are used in connection with preventing or otherwise minimizing fire damage to real and personal property. To that end, conventional fire suppression systems typically include a source of fluid, such as water or a fire retardant chemical, disposed in fluid communication with a nozzle that is used to spray or otherwise direct the fluid to an active fire. The source of fluid may be realized in a number of different ways, such as by a storage tank or a high-flow industrial water utility connection, and may be portable, such as with a municipal firefighting truck/tanker. Typically, the nozzles are configured to be moved, re-positioned, or otherwise manipulated in relation to the source of fluid. By way of example, a length of hose or pipe extending between the nozzle and the source of fluid may be employed so that the nozzle can be selectively moved away from the source of fluid while maintaining fluid communication therewith. Fire suppression systems also typically include a valve interposed in fluid communication between the source of fluid and the nozzle. The valve is used to selectively control the flow of water or fire retardant liquid, and is frequently positioned at or near the nozzle.

Most fire suppression systems can be characterized as either a "responsive" or a "preventative" system. Responsive systems are used to extinguish what are generally "unexpected" fires (for example, where a municipal fire truck is dispatched to extinguish a residential house fire). Preventative systems, on the other hand, are used in connection with extinguishing fires in predetermined, and often high-risk, areas (for example, a fire sprinkler system positioned near a gas pumping station). However, certain fire suppression systems can be both responsive and preventative, depending on the application and intended use (for example, a hand-operated fire extinguisher stored in a fry kitchen occasionally used to put out grease fires). It will be appreciated that both responsive and preventative fire suppression systems may vary in terms of system size, extinguishing capability, and mobility.

Fire suppression systems may also include or otherwise cooperate with one or more fire detection systems. As the name suggests, fire detection systems are used to detect and respond to fire ignition. Typically, fire detection systems respond to the presence of fire by sounding a warning alarm (for example, a residential smoke detector alarm) and/or by automatically activating one or more suppression systems (for example, activating a fire sprinkler). Thus, fire detection systems are frequently used to warn people nearby of potential danger and, at the same time, may prompt those people to manually activate one or more fire suppression systems (for example, calling a fire department dispatch center).

Each of the components of a fire suppression system of the type described above must cooperate to detect and extinguish fire in an expedited amount of time so as to minimize damage and prevent the fire from spreading or growing uncontrollably. In addition, each of the components must be designed so as to ensure optimized and efficient use of the available supply of fluid from the source.

SUMMARY

An aspect of the disclosure provides a computer-implemented method, when executed by data processing hardware, causes the data processing hardware to perform operations. These operations include receiving an alarm signal associated with a thermal event, receiving thermal imaging data for an observation zone associated with the thermal event, evaluating the thermal imaging data to determine at least one of a location and an area of the thermal event within the observation zone, obtaining a configuration record including configuration parameters for a retardant dispenser associated with the observation zone, and instructing the dispenser to provide a retardant to the thermal event using the configuration parameters.

Implementations of the disclosure may include one or more of the following optional features. In some implementations, obtaining the configuration record includes selecting the configuration record from the configuration storage, also including predetermined configuration records. In some examples, the operations further include determining an alarm score for the alarm signal and selectively filtering the alarm signal based on the alarm score. In some configurations, the determining the alarm score includes obtaining optical data for the observation area associated with the thermal event, obtaining environmental sensor data for the observation area, evaluating at least two of the thermal imaging data, the optical data, and the environmental data for the observation area, generating a response or score for each of the thermal imaging data, the optical data, and the environmental data, and calculating the alarm score based on the response or score. In some implementations, evaluating the optical data includes at least one of determining a presence of smoke, determining a value of light energy, and identifying a fire object.

In some configurations, evaluating the environmental data includes identifying infrared energy within the observation area independent of the thermal imaging data and/or determining an occupancy of the observation area based on at least one of (a) considering a day and time and (b) occupancy sensor data for the observation area. In some examples, evaluating the thermal imaging data includes evaluating at least one of a temperature magnitude and a temperature change. In some implementations, the operations include determining a network connectivity status for a fire suppression system, and instructing a fire suppression system to execute a predetermined fire suppression protocol when the network connectivity status is inactive. In some implementations, the fire suppression protocol includes a predetermined retardant spray pattern.

Another aspect of the disclosure provides a system that includes data processing hardware and memory hardware in communication with the data processing hardware, the memory hardware storing instructions that when executed on the data processing hardware cause the data processing hardware to perform operations. These operations include receiving an alarm signal associated with a thermal event, receiving thermal imaging data for an observation zone associated with the thermal event, evaluating the thermal imaging data to determine at least one of a location and an area of the thermal event within the observation zone, obtaining a configuration record including configuration parameters for a retardant dispenser associated with the observation zone, and instructing the dispenser to provide a retardant to the thermal event using the configuration parameters.

This aspect may include one or more of the following optional features. In some configurations, obtaining the configuration record comprises selecting the configuration record from a configuration storage including predetermined configuration records.

In some implementations, the operations include determining an alarm score for the alarm signal, and selectively filtering the alarm signal based on the alarm score. In some examples, determining the alarm score includes obtaining optical data for the observation area associated with the thermal event, obtaining environmental sensor data for the observation area, evaluating at least two of the thermal imaging data, the optical data, and the environmental data for the observation area, generating a response or score for each of the thermal imaging data, the optical data, and the environmental data, and calculating the alarm score based on the response or score. In some examples, evaluating the optical data includes at least one of determining a presence of smoke, determining a value of light energy, and identifying a fire object.

In some configuration, evaluating the environmental data includes identifying infrared energy within the observation area independent of the thermal imaging data and/or determining an occupancy of the observation area based on at least one of (a) considering a day and time and (b) occupancy sensor data for the observation area. In some implementations, evaluating the thermal imaging data includes evaluating at least one of a temperature magnitude and a temperature change.

In some examples, the operations further include determining a network connectivity status for a fire suppression system and instructing a fire suppression system to execute a predetermined fire suppression protocol when the network connectivity status is inactive. Here, the fire suppression protocol includes a predetermined retardant spray pattern.

Another aspect of the disclosure provides a computer-implemented method, that when executed by data processing hardware, causes the data processing hardware to perform operations. These operations include receiving measured operating data for one or more components of a retardant dispenser, the measured operating data including one or more measured operating parameters for the component, evaluating the measured operating data to determine whether the one or more measured operating parameters for the component exceeds a threshold operating parameter for the component, when the one or more measured operating parameters exceeds the threshold operating parameter, generating a maintenance signal, and executing a maintenance response based on the maintenance signal.

This aspect may include one or more of the following optional features. In some implementations, the operations include executing a dispenser maintenance diagnostic routine with instructions for moving one of the components of the dispenser through a predetermined range of motion, and evaluating measured operating data associated with the one of the components corresponding to the dispenser maintenance diagnostic routine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
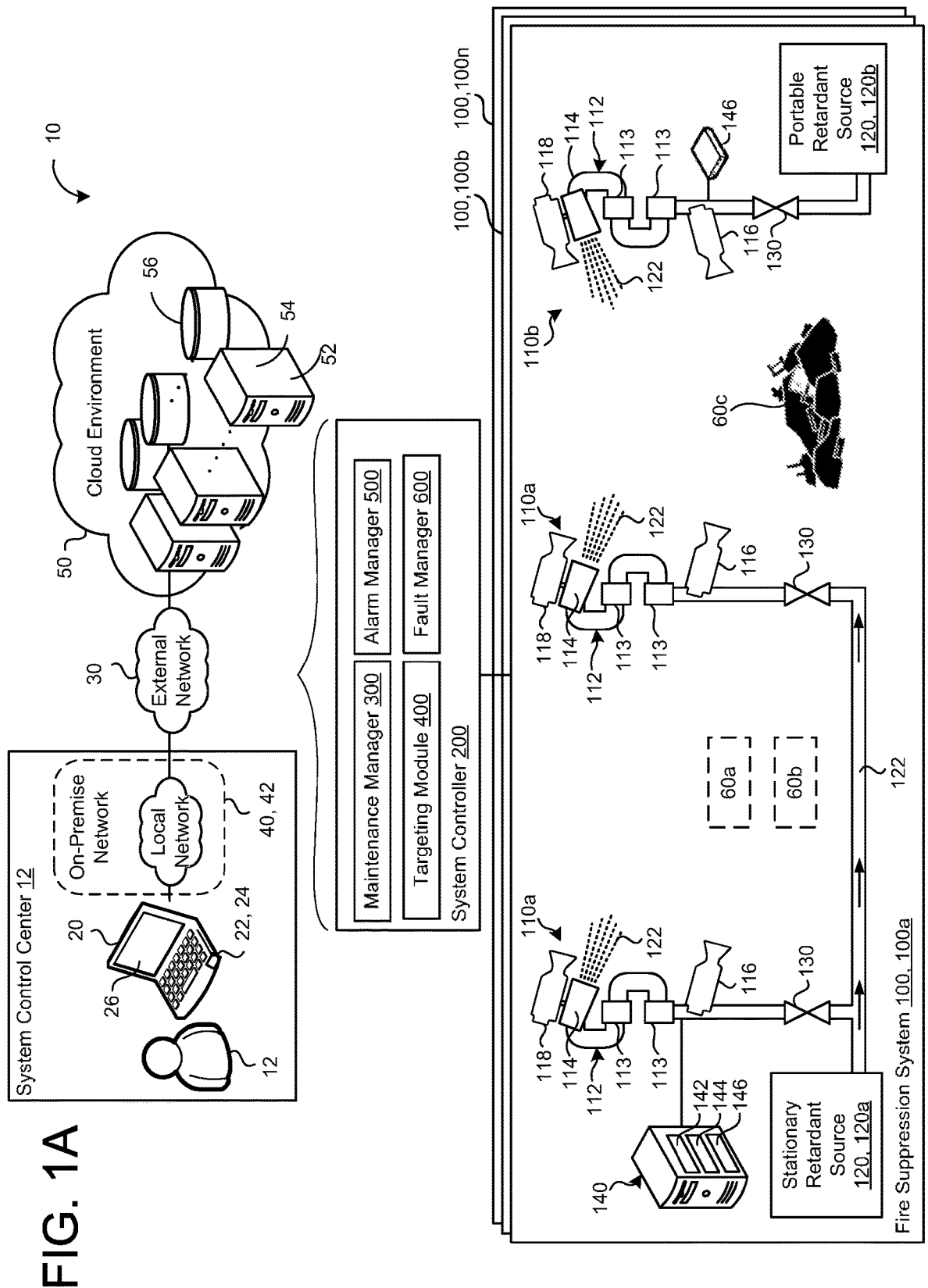
FIG. 1A is schematic view of an example system for monitoring and suppressing thermal events according to the present disclosure.
Figure 1B:
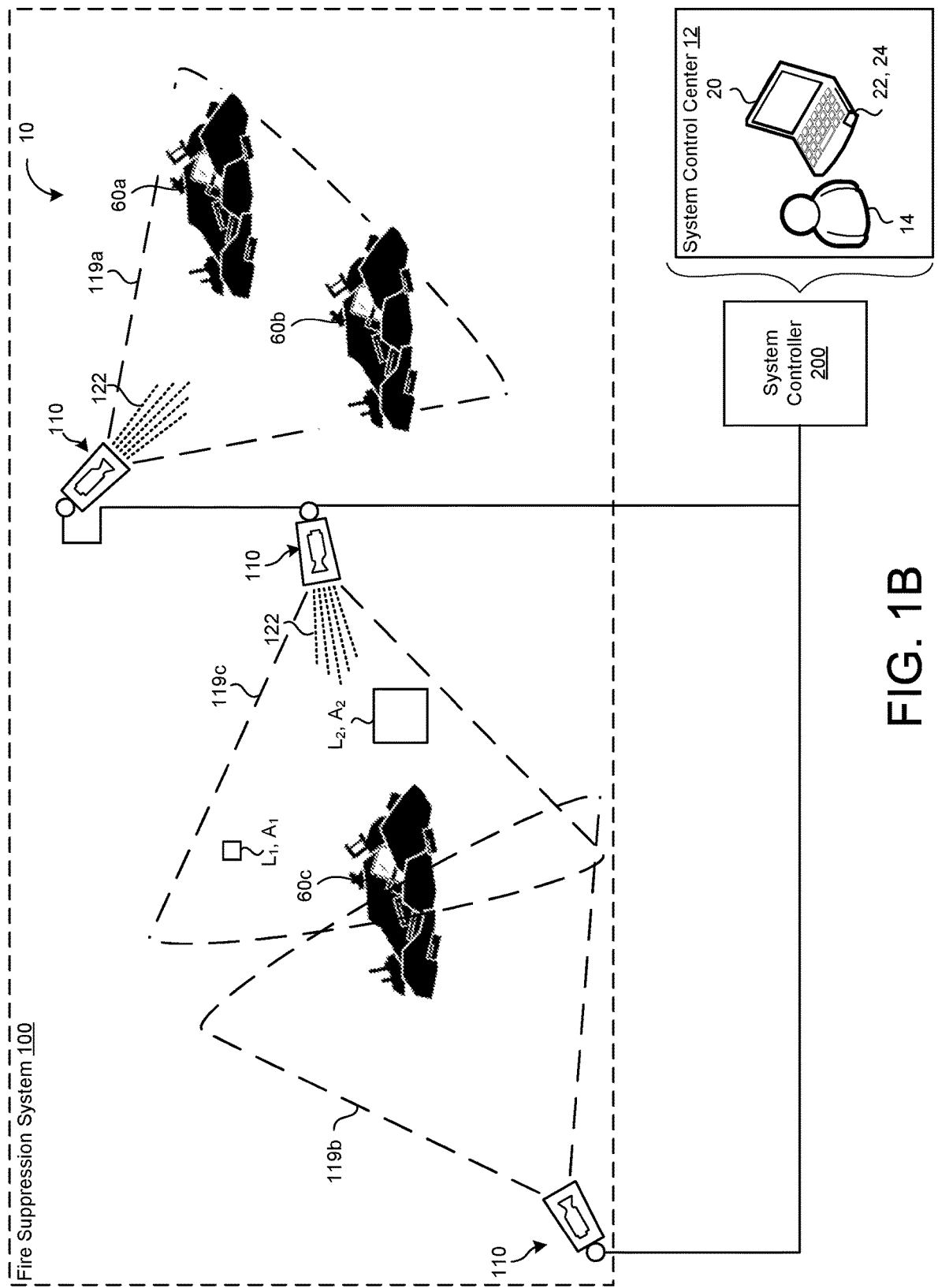
FIG. 1B is a plan view of an example of the system of FIG. 1A.

Referring to FIGS. 1A and 1B, in some implementations, an example fire management system 10 includes a system control center 12 in communication with a fire suppression system 100. The system control center 12 includes a user device 20 associated with a respective operator 14. The system control center 12 is in communication with an external network 30 (e.g., the Internet, cellular networks). Optionally, the user device 20 may be connected to the external network 30 via an on-premises network 40 (i.e., the local network that the user device 20 uses to connect to the network 30). The on-premises network 40 includes a network gateway 42 (e.g., a router) that serves as the forwarding host for the on-premises network 40. The user device 20 may correspond to any computing device, such as a desktop workstation, a laptop workstation, or a mobile device (e.g., a smart phone or tablet). The user device 20 includes computing resources 22 (e.g., data processing hardware) and/or storage resources 24 (e.g., memory hardware). The user device 20 may also include or be connected to a graphical user interface 26 allowing the operator 14 to view and control one or more fire suppression systems 100.

Optionally, the system control center 12 may be in communication with a cloud network 50 including a single computer, multiple computers, or a distributed system (e.g., a cloud environment) having scalable/elastic resources 52 including computing resources 54 (e.g., data processing hardware) and/or storage resources 56 (e.g., memory hardware). A data store (i.e., a remote storage device) may be overlain on the storage resources 56 to allow scalable use of the storage resources 56 by one or more of the client or computing resources 54. The cloud network 50 is configured to implement and execute one or more virtual machines (VMs). One or more of the VMs execute securely in a virtual private cloud (VPC) environment associated with or operated by the user 12.

The system control center 12 is depicted as being adjacent to the fire suppression system 100 for illustrative purposes. However, the system control center 12 could be located at any suitable distance from the fire suppression system 100 so long as commands and signals can be sent and received across the communication network 30, 40. Further, it is conceivable that fire suppression system 100 of the present disclosure could also cooperate with other types of fire suppression systems. By way of example, the operator 14 at the system control center 12 could coordinate with a municipal fire department to dispatch one or more fire trucks site of the fire suppression system 100 so as to provide additional fire extinguishing capability.

FIGS. 1A-6 provide a fire suppression system 100 used to detect and extinguish fires occurring within a predetermined, coverage zone 119. Specifically, the fire suppression system 100 is adapted to detect the presence of fire in the predetermined coverage zone and is configured to subsequently facilitate fire extinguishing in response to commands received from the system control center 12 and/or a fire suppression system controller 200 executing on one or more of the user device 20, the cloud environment 50, or at the fire suppression system 100. As detailed below, the fire suppression system 100 includes a plurality of retardant dispensers 110 each connected to a retardant source 120 by a control valve 130, and one or more dispenser control units 140 for communicating, storing, and executing data associated with each dispenser 110.

The fire suppression system 100 may be remotely located from the system control center 12, such that the fire suppression system 100 communicates with the system control center 12 via the external network 30. Additionally or alternatively, the fire management system 10 may include a system control center 12 that communicates directly with the fire suppression system 100 via the on-premises network 40. While FIG. 1A details a single fire suppression system 100a in communication with the system control center 12, in some examples, the system control center 12 may communicate with any number of local or remote fire suppression systems 100, 100a-100n via the external network 30 (e.g., for remote fire suppression systems 100) and/or the on-premises network 40 (e.g., for local fire suppression systems).

The one or more dispenser control units 140 are disposed in electrical communication with the various components of the fire suppression system 100 for transmitting dispenser data 148 to the system control center 12 and executing dispenser commands received from the system control center 12 and/or the system controller 200. The control unit 140 includes computing resources 142 (e.g., data processing hardware) and/or storage resources 144 (e.g., memory hardware). The control unit 140 may further include a network switch 146 providing communication with the network 30, 40. While FIG. 1A shows a single control unit 140 connected to a single dispenser 110 for the sake of clarity, the control unit 140 may be connected to a plurality of the dispensers 100 within the fire suppression system 100. Alternatively, the control unit 140 may be embodied within the cloud environment 50 and in communication one or more dispensers 110 via a network switch 146. While the illustrated example shows the control unit 140 as a personal computing (PC) system, the control unit 140 may include a programmable logic controller (PLC) as a control device.

The network switch 146 of the fire suppression system 100 is used to facilitate communication between the control unit 140 and the system control center 12 across the communication network 30. In the representative embodiment illustrated herein, the network switch 146 is realized as a "Power Over Ethernet" network switch that interacts with the system control center 12 across the communication network 30. However, those having ordinary skill in the art will appreciate that the network switch 146 could be configured differently and could communicate with the system control center 12 in a number of different ways without departing from the scope of the present disclosure. By way of non-limiting example, the network switch 146 could incorporate or otherwise could communicate with the system control center 12 across the communication network 30 via a wireless connection point, such as a WiFi local area network connection, or a cellular data connection.

With continued reference to FIGS. 1A and 1B, the fire suppression system 100 includes one or more of the retardant dispensers 110, 110a, 110b each in fluid communication with a fire retardant source 120. Each dispenser 110 is associated with a corresponding coverage zone 119, which may encompass one or more observation sites 60, 60a-60c. In some examples, multiple dispensers 110 may be associated with a common observation site 60c to provide at least partial overlap and redundancy between coverage zones 119 of the dispensers 110. For example, in FIG. 1B, a first coverage zone 119a associated with a dispenser 110 encompasses first and second observation sites 60a, 60b while second and third coverage zones 119b, 119c associated with second and third dispensers 110 overlap a common observation site 60c.

As shown in FIG. 1A, the retardant dispensers 110 may include stationary retardant dispensers 110a connected to a stationary retardant source 120a, such as a utility connection. Additionally or alternatively, the retardant dispensers 110b may include portable retardant dispensers 110b connected to a portable retardant source 120b, such as a portable tank system. Each dispenser 110 is connected to the respective retardant source 120 via a control valve 130, which selectively permits the retardant 122 to flow to the dispenser 110 for application on an observation site 60.

The retardant source 120 contains a fire retardant 122 suitable for suppressing a thermal event (e.g., fire, hot spot). The retardant source 120 can include any type of fire retardant 122, such as water or a predetermined mixture of water and concentrated fire retardant foam. As provided above, the retardant source 120 may be a stationary retardant source 120a, such as a conventional well or an industrial water utility connection, either alone or in connection with stored concentrated fire retardant foam. Additionally or alternatively, the retardant source 120 may include a portable retardant source 120b that stores the retardant 122 in a selectively-pressurized vessel and can positioned in any suitable way with respect to the dispenser 110 and the coverage zone 119 without departing from the scope of the present disclosure. An example of a portable dispenser 110 and retardant source 120b includes the Fire Rover™ fire suppression system described in U.S. Pat. No. 10,514,809, which is hereby incorporated by reference in its entirety.

Figure 2:
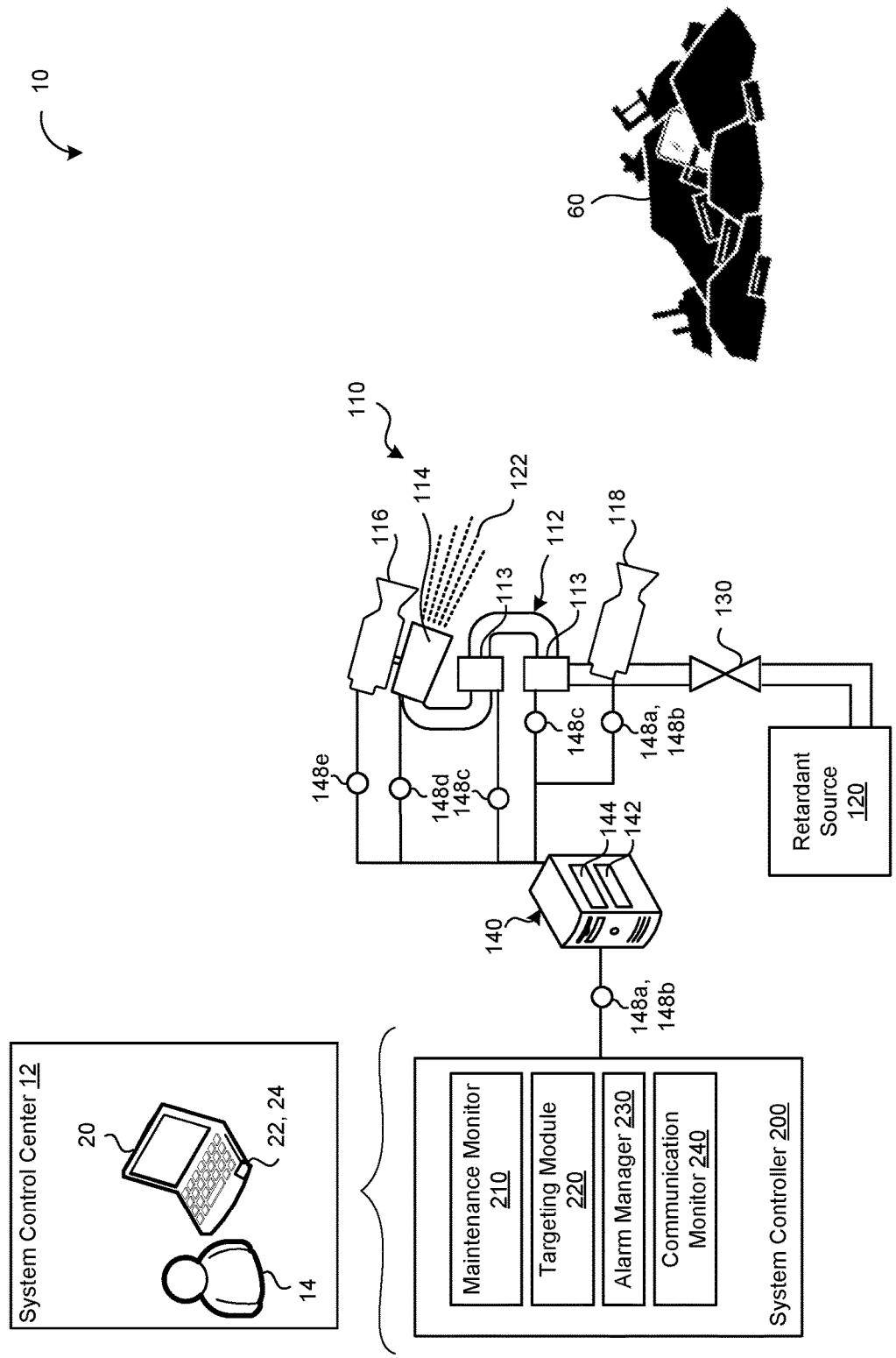
FIG. 2 is a schematic view of a fire suppression system controller according to the present disclosure.

With reference to FIGS. 1A-2, each retardant dispenser 110 includes a monitor 112 having an articulable nozzle 114 for selectively directing the retardant 122 to the coverage zone. The monitor 112 may further include a video camera 116 to provide optical data 148e of the coverage zone 119 to the system control center 12, as described in greater detail below. Each dispenser 110 may also include a forwardlooking thermographic camera 118 that generates thermal imaging data 148*a* of a coverage zone 119 using observed infrared radiation.

As noted above, the monitor 112 is used to selectively direct retardant 122 into the coverage zone 119 or otherwise towards one of the observation cites 60. The monitor 112 (sometimes referred to in the related art as a "deck gun," a "master stream," or a "water cannon") is typically adjustable in orientation and includes a nozzle 114 disposed in selective fluid communication with the retardant source 120 via the control valve 130. The nozzle 114 is employed to facilitate adjustment of the pressure and/or flowrate of the retardant 122 by "fogging" or "fanning" the stream of fire retardant liquid. By changing the flowrate via the nozzle 114, the monitor 112 can be used to direct liquid from the retardant source 120 at selectively adjustable distances, as discussed below. In one embodiment, the nozzle 114 is in electrical communication with a control unit 140 which, in turn, is used to selectively drive the nozzle actuator 32A to adjust the flow of retardant 122 through the nozzle 114.

In one embodiment, the monitor 112 employs a multi-axis articulation system including a plurality of articulation actuators 113, which are configured to selectively articulate the monitor 112 so as to effect positional control of the nozzle 114 in order to aim retardant 122 flowing from the monitor 112 within the coverage zone 119. As discussed in greater detail below, the nozzle 114 and each of the actuators 113 may be independently monitored and controlled.

As noted above, the fire suppression system 100 also includes a control valve 130 interposed in fluid communication between the source 120 and the monitor 112. The control valve 130 is selectively movable between a valve-closed position, wherein retardant 122 is prevented from flowing through the control valve 130, and a valve-open position wherein retardant 122 can flow through the control valve 130 to the monitor 112. The control unit 140 is adapted to move the control valve 130 between the valve-closed position and the valve-open position in response to commands received from the system control center 12 and/or the system controller 200. Thus, the control valve 130 could be of any suitable type sufficient to be electronically actuated by the system controller 200 and control the flow of retardant 122 to the monitor 112, without departing from the scope of the present disclosure. By way of non-limiting example, the control valve 130 could be a conventional solenoid-actuated ball valve.

As illustrated in FIG. 2, the control valve 130 is disposed adjacent to the retardant source 120. However, those having ordinary skill in the art will appreciate that the control valve 130 could be arranged in any suitable location sufficient to direct fluid towards the monitor 112 from the source 120, without departing from the scope of the present disclosure. By way of non-limiting example, the control valve 130 could be implemented integrally with or otherwise as a part of the monitor 112, depending on application requirements.

The video camera 116, which may include a conventional color camera, is arranged to view to coverage zone 119. The camera 116 is disposed in electrical communication with the control unit 140, which cooperates with the camera 116 to transmit visual imaging data of the coverage zone 119 to the system control center 12, as described in greater detail below. In the representative embodiment illustrated herein, the camera 116 is operatively for concurrent movement with the nozzle 114.

As noted above, the fire suppression system 100 employs a thermographic camera 118 operatively attached adjacent to the monitor 112 which is configured to detect temperature changes occurring within the coverage zone 119, such as may occur when a fire has ignited in the coverage zone 119. In one embodiment, the thermographic camera 118 is also configured to transmit thermal imaging data to the system control center 12 via the network 30, 40, as described in greater detail below. In the representative embodiment illustrated herein, the thermographic camera 118 is operatively attached to the dispenser 110 adjacent to the monitor 112. Here, the position of the thermographic camera 118 is fixed for viewing of the coverage zone 119. However, thermographic camera 118 could be arranged or mounted in any suitable way sufficient to detect temperature changes within the coverage zone 119, and/or may employ an independent articulation system configured to facilitate movement of the thermographic camera 118. It is also conceivable that the thermographic camera 118 could be mounted for concurrent movement with the nozzle 114, similar to the video camera 116.

The thermographic camera 118 may be programmed or otherwise configured to generate an alarm signal 148*b* when the temperature of an object positioned within the coverage zone 119 reaches one or more predetermined operating limits, such as a specific temperature or temperature/time threshold. By way of non-limiting example, the thermographic camera 118 could generate the alarm signal 148*b* when an object within the coverage zone 119 exhibits a surface temperature in excess of 400-degrees Fahrenheit for more than 5 seconds.

The thermographic camera 118 is disposed in electrical communication with the control unit 140 which, in turn, is responsive to the alarm signal 148*b* and relays the alarm signal 148*b* to the system control center 12 and/or the system controller 200 across the network 30, 40. Advantageously, the alarm signal 148*b* generated by the thermographic camera 118 may be realized using conventional direct current voltage, triggered such as by a relay output, which may be implemented within the thermographic camera 118. However, those having ordinary skill in the art will appreciate that the signal could be of any suitable type that is generated, communicated, or relayed in any suitable way by the thermographic camera 118 to the control unit 140, or by any other suitable component of the fire suppression system 100, without departing from the scope of the present disclosure.

Those having ordinary skill in the art will appreciate that the schematic representation of the system depicted in FIGS. 1A-6 are not wiring diagrams and are intended to demonstrate generic electrical communication between the various components of the fire management system 10. Thus, specific wiring and/or electrical connections between the various components of the fire suppression system 100 may necessitate or otherwise benefit from the use of one or more power supplies, fuses, filters, relays, transistors, resistors, and the like (not shown, but generally known in the related art) employed to facilitate electrical communication between the various components of the fire suppression system 100 and/or the system control center 12.

In operation, the fire suppression system 100 monitors the coverage zone 119 for predetermined increases in temperature. When an observed temperature threshold is observed by the thermographic camera 118, the thermographic camera 118 generates the alarm signal 148*b*, which is forwarded to the system control center 12 and/or the system controller 200 via the control unit 140. The operator 14 can subsequently evaluate alarm signals 148*b* received from the control unit 140 and selectively control the monitor 112 to extinguish the fire within the coverage zone 119. To that end, the operator at the system control center 12 may view image data received from one or both of the cameras 116, 118, and could selectively actuate one or more input controls (for example a button, a touchscreen, or a joystick: not shown, but generally known in the art) to selectively control the control valve 130 and the monitor 112.

With continued reference to FIG. 1A, the fire management system 10 includes the fire suppression system controller 200 configured to analyze the dispenser data 148 received from the one or more dispensers 110 of the fire suppression system 100 and to generate responsive tasks, recommendations, or reports based on the dispenser data. The system controller 200 may be executed on the user device 20 and/or on the resources 52 of the cloud network 50. Additionally or alternatively, the system controller 200, or at least some modules 300, 400, 500, 600 of the system controller 200 may be executed locally by the one or more control units 140.

Figure 3:
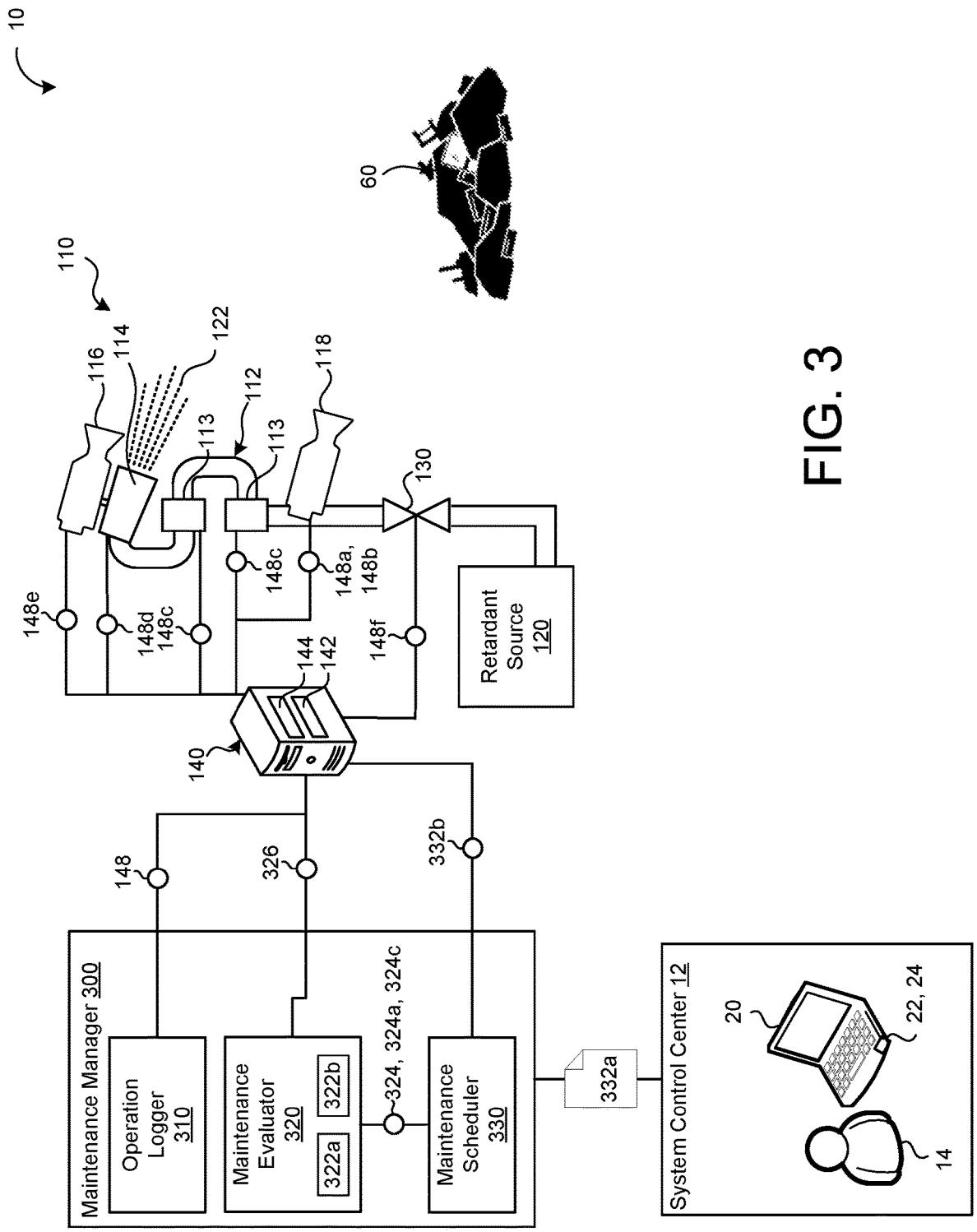
FIG. 3 is a schematic view of an example of a maintenance manager according to the present disclosure.

FIG. 3 provides a simplified schematic of the fire management system 10 showing the maintenance manager 300 of the system controller 200 and one of the dispensers 110. The maintenance manager 300 may include an operation logger 320 that obtains or receives and stores the operation data 148 from dispenser. The maintenance manager 300 also includes a maintenance evaluator 320 configured to analyze the operating data 148 of one or more dispensers 110 and a maintenance scheduler 330 configured to generate maintenance outputs (e.g., a report, diagnostic routine) based on the operating data.

The maintenance evaluator 320 may execute maintenance evaluation operations 322 for determining a maintenance status of the one or more dispensers. The maintenance evaluation operations 322 may include passive maintenance evaluation operations 322a based on dispenser data 148 obtained or received from the dispenser 110 during normal use, as well as active maintenance evaluation operations 322b involving evaluating dispenser data 148 responsive to one or more dispenser maintenance diagnostic routines 326 assigned to the dispenser 110 by the maintenance evaluator 320.

Passive maintenance evaluation operations 322a include receiving measured operating data 148c, 148d from each of the actuators 113 and the nozzle 114 and determining a maintenance status based on the operating data 148c, 148d. Examples of measured operating data 148c, 148d may include odometry data obtained from one or more position sensors, voltage or current data obtained from motors of the actuators 113 or nozzle 114, operational event data (e.g., high component temperature events, impact events, joint over-limit events, etc.), and/or environmental conditions (e.g., temperature, humidity, etc.) that may impact life of a component 113, 114. Using the measured operating data 148a, 148b, the maintenance evaluator 320 may determine that maintenance is necessary based on a pre-determined operating thresholds. For example, when the cumulative odometry data 148c for a particular actuator 113 exceeds a predetermined odometry threshold, the maintenance evaluator 320 may transmit a maintenance signal 324 to the maintenance scheduler 330 identifying components 113, 114 requiring maintenance attention.

As opposed to passive maintenance evaluation operations 322a discussed above, which rely on operating data 148c, 148d obtained over a period of normal use of the dispenser 110, active maintenance evaluating operations 322b include pushing a dispenser maintenance diagnostic routine 326 to one or more of the dispensers 110 to evaluate current condition and performance of the dispenser 110. The dispenser maintenance diagnostic routine 326 may be regularly scheduled to execute during periods where thermal events 62 are less likely to occur (i.e., after facility operating hours) or may be initiated on-demand by an operator 14 via the user device 20.

The dispenser maintenance diagnostic routine 326 includes instructions for moving the actuators 113 and/or nozzle 114 through a desired range of motion. For example, the maintenance diagnostic routine 326 may include instructions for moving an actuator 113 through a full range of motion between position limits. In another example, the maintenance diagnostic routine 326 may include instructions for transitioning the nozzle 114 between an open state and a closed state. In another example, the maintenance diagnostic routine 326 may include instructions for moving the control valve 130 between an open and closed state.

During execution of the maintenance diagnostic routine 326 by the dispenser 110, the maintenance evaluator 320 obtains the measured operating data 148, 148c, 148d, 148f from the components 113, 114, 130. The maintenance evaluator 320 then determines whether one or more of the dispenser components 113, 114, 130 are operating properly or require maintenance attention based on the operating data 148, 148c, 148d, 148f associated with (i.e., collected during) the maintenance diagnostic routine 326. For example, the maintenance evaluator 320 may compare the measured diagnostic operating data 148, 148c, 148d, 148f against specification operating data for each component 113, 114, 130 to determine whether the component 113, 114, 130 is functioning within a threshold performance band.

In one example, the diagnostic operating data 148 may include a measured voltage associated with a motor of one of the components 113, 114, 130. Here, the measured voltage is compared against a specification operating voltage for the motor (e.g., based on manufacturer specifications). Where the measured voltage differs from the specification voltage by a threshold amount (e.g., +/−5%), the maintenance evaluator 320 determines that the component 113, 114, 130 is operating at a less-than-optimal state and generates the maintenance signal 324.

In another example, the diagnostic operating data 148 may include a measured component movement rate or duration for the maintenance diagnostic routine 326. For example, the duration may be the amount of time the component 113, 114, 130 takes to complete the instructed movement. The measured rate or time 148 may be compared against a specification rate or time to determine whether the component 113, 114, 130 is operating properly. Where the measured rate or duration differs from the baseline rate or duration by a threshold amount (i.e., +/−5), the maintenance evaluator 320 determines that the component 113, 114, 130 is operating at a less-than-optimal state and generates the maintenance signal 324.

While the maintenance thresholds may be predetermined based on component manufacturer specifications, the maintenance thresholds may also be generated by the system controller 200. For example, the operation logger 310 may log measured operating data 148 during normal use or diagnostic operating data 148 associated with the maintenance diagnostic routine 326. Here, the maintenance evaluator 320 monitors the operating data 148 over time and generates baseline and threshold values for the operating data 148. The maintenance evaluator may generate the maintenance signal 324 when a measured operating data 148 indicates a change in performance over time that exceeds a threshold value. By evaluating operating data 148 trends over time, the maintenance evaluator 320 can account for environmental and usage changes for the dispenser 110.

As previously discussed, the maintenance evaluator generates and transmits a maintenance signal 324 to the maintenance scheduler 330 so that the maintenance scheduler 330 can generate a maintenance response 332. The maintenance signal 324 may be a binary signal 324a simply indicating whether measured operating data 148 for a component of the dispenser 110 falls outside of a threshold value. However, the maintenance signal 324 may include a progressive maintenance signal 324b depending on the determination of the maintenance evaluator 320. For example, where the maintenance evaluator 320 determines that that the measured operating data 148 exceeds a first maintenance threshold value (e.g., +/−5%), the progressive maintenance signal 324b may indicate a first maintenance priority level associated with preventative maintenance and when the measured operating data 148 exceeds a second maintenance threshold value (e.g., +/−10%) the progressive maintenance signal 324b may indicate a second maintenance priority level associated with urgent maintenance or repair.

The maintenance scheduler 330 generates the maintenance response 332 based on the maintenance signal 324. For example, in response to receiving the progressive maintenance signal 324b indicating that the measured operating data 148 falls between the first maintenance threshold value and the second maintenance threshold value, the maintenance scheduler 330 may generate a passive maintenance output 332a such as creating and transmitting a maintenance report 334 for display on the user device 20. In another example, in response to receiving the progressive maintenance signal indicating that the measured operating data 148 exceeds the second maintenance threshold value, the maintenance scheduler 330 generates an active maintenance out 332b for the dispenser 110. For example, the active maintenance out 332b may include terminating or limiting operation of the dispenser 110, executing a dispenser component diagnostic routine, and/or executing a dispenser maintenance routine (i.e., applying lubricant, cycling through component range-of-motion, etc.).

Figure 4:
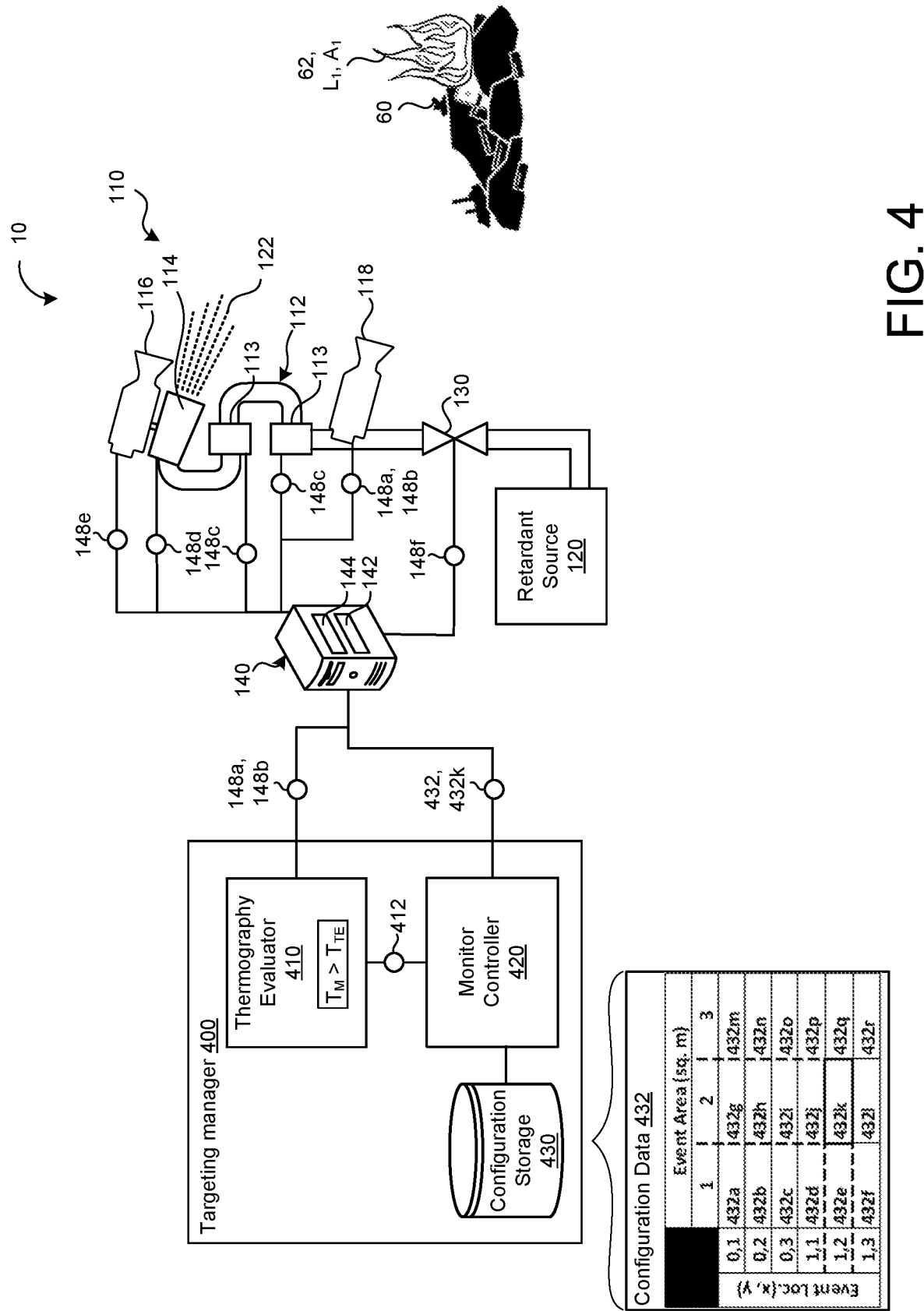
FIG. 4 is a schematic view of an example of a targeting manager according to the present disclosure.

Referring now to FIG. 4, the targeting manager 400 includes a thermography evaluator 410 configured to receive thermal imaging data 148a and/or the alarm signal 148b from the thermography camera 118. The targeting manager 400 also includes a nozzle controller 320 that determines and controls an orientation and state (i.e., fan or stream) of the nozzle 114 based on configuration data 324. Again, while FIG. 4 shows the targeting manager 400 associated with a single dispenser 110, the targeting manager 400 may be communicate with a plurality of dispensers, such as in FIG. 1A or 2.

The thermography evaluator 410 receives the thermal imaging data 148a of the coverage zone 119 and continuously analyzes the thermal imaging data 148a to determine whether a thermal event 62 (e.g., fire, hot spot) is occurring at one of the observation sites 60. Here, the thermography evaluator 410 may determine that a thermal event 62 is occurring within the observation zone 119 where pixels within the thermal imaging data 148 indicate an observed or measured temperature $T_M$ that exceeds a thermal event threshold temperature $T_{TE}$. Additionally or alternatively, the thermal event 62 may be indicated by the alarm signal 148b generated by the thermography camera 118.

When the thermography camera 118 sends an alarm signal 148b and/or the thermography evaluator 410 determines that a thermal event 62 is present within the coverage zone 119, the thermography evaluator 410 executes a mapping operation to generate thermal event data 412 including a location (i.e., coordinate position) and area (i.e., size) of the thermal event 62. In some examples, where the position of the thermography camera 118 is fixed, the location and area of the thermal event 62 may be determined by associating a pixel of the thermal imaging data 148a with a predetermined pixel map of the coverage zone 119. Thus, each pixel corresponds to a known location in the coverage zone 119. In other examples, the location of the thermal event 62 may be determined in real-time by the thermography evaluator 410 using known methods and systems for determining range (i.e., triangulation, radar, etc.).

Once the thermography evaluator 410 generates the thermal event data 412 for the thermal event 62, the monitor controller 420 generates or obtains monitor instructions 406 for automatically moving the monitor 320 to an optimized configuration for targeting the thermal event 62. In some examples, the nozzle instructions 406 are generated based off of stored configuration data 430 for the dispenser 110. The configuration data 430 may include monitor configuration records 432a-432r associated with each location L and a range of areas A within the coverage zone 119. For example, referring to FIG. 1B, the coverage zone 119 is shown with a first location $L_1$ having a first area $A_1$ and a second location $L_2$ having a second area $A_2$. The configuration data 430 may include a first targeting record 432a including monitor configuration parameters for aiming the retardant stream 122 at location A and a second targeting record 432b including monitor configuration parameters for aiming the retardant stream 122 at location B.

Referring again to FIG. 4, in the illustrated example the monitor controller 420 determines the monitor configuration 432a-432r by executing a lookup operation based on the location L and area A identified in the thermal event data 412. By way of example, thermal event data 412 my identify a thermal event 62 at location A, where location A has an x-y coordinate position of (1,2) relative to a coordinate plane associated with the dispenser 110 and an area of 2 square meters. Here, the monitor controller 420 executes a look-up operation to find the record associated with the location at (1,2) and an area 2 square meters and selects the configuration record 432k.

The monitor controller 420 then transmits the selected record 432, 432k to the dispenser control unit 140, which configures the monitor 112 according to the configuration parameters in the targeting record 432k. The configuration parameters include actuator and nozzle position parameters for aiming the nozzle 114, a nozzle state parameter for controlling retardant application area (i.e., fanning or stream), and one or more control valve parameters for controlling a volume or pressure of the retardant 122 provided to the nozzle 114 by the control valve 130. In other examples, other configuration parameters may control operation of the retardant source 120. For example, certain observation cites 60 may be associated with different types of fires (e.g., chemical vs. paper) in the thermal event data 430. Accordingly, the configuration data 432 may include parameters for selecting or adjusting the type of retardant 122 based on the type of fire associated with the thermal event data 412.

Figure 5:
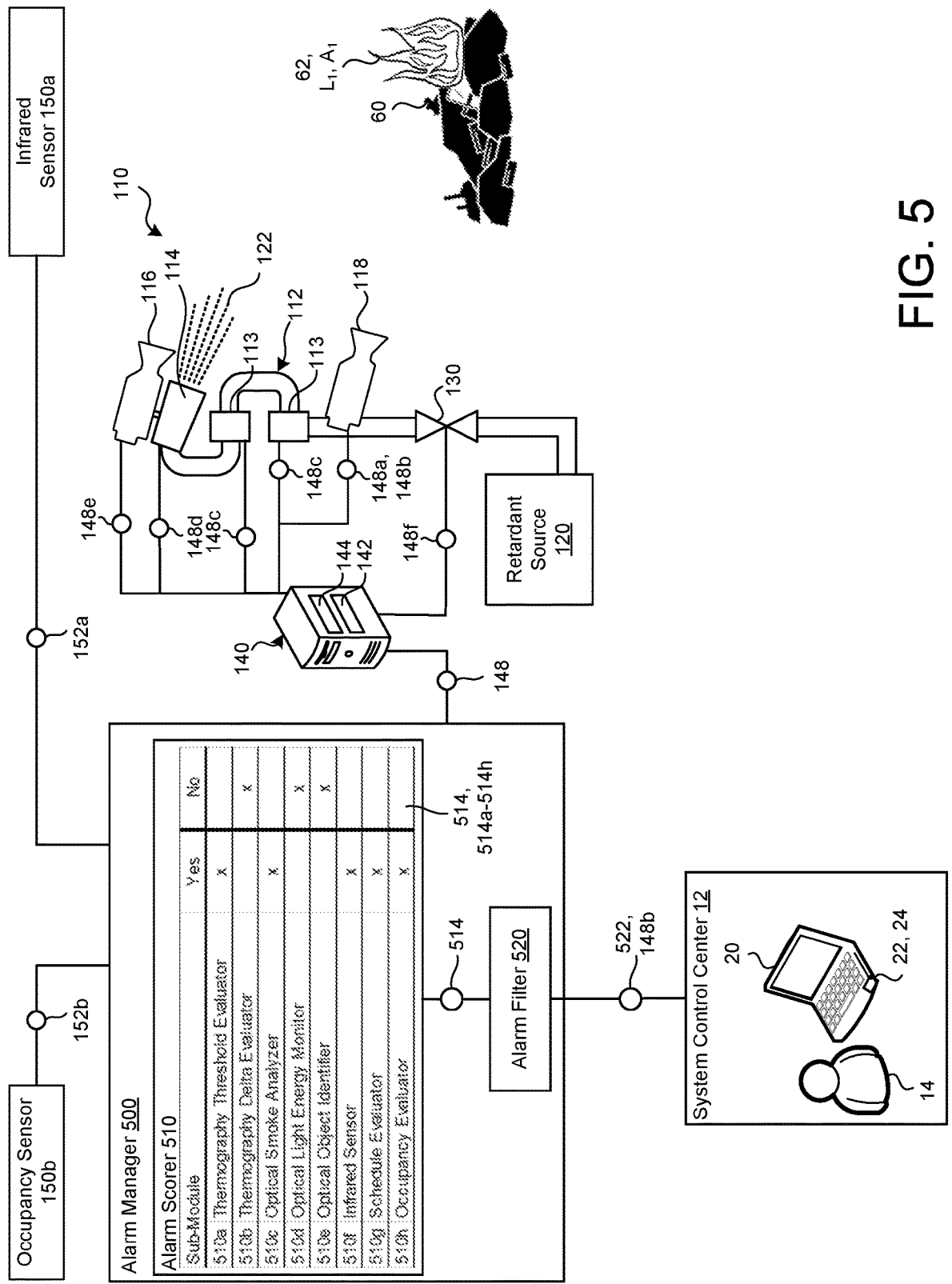
FIG. 5 is a schematic view of an example of an alarm manager according to the present disclosure.

Referring now to FIG. 5, the alarm manager 500 of the fire suppression system controller 200 scores and filters alarm signals 148b or thermal event data 412 based on sensor data 148, 152 received from a plurality of sensors 116, 118, 150 associated with the dispenser 110 and fire suppression system 100. Here, the alarm manager 500 includes an alarm scorer 510 that evaluates the sensor data 148 to generate an alarm score 514, and an alarm filter 520 that determines whether or not to forward an alarm signal 148b or thermal event data 412 based on the alarm score 514.

In addition to the thermal imaging data 148a obtained from the thermography camera 118 and the optical data 148e received from the video camera 116, the alarm manager 500 may also receive data 152 from other sensors 150 associated with the fire suppression system 100. For example, the fire suppression system 100 may include one or more infrared flame sensors 150a located remotely from the dispenser 110 to measure infrared activity at an observation cite 60c. Additionally or alternatively, the fire suppression system 100 includes occupancy sensors 150b, such as motion sensors or door sensors that provide occupancy data 152b around the coverage zone 119 and observation cites 60.

The alarm scorer 510 includes a plurality of sub-modules 510a-510h configured to analyze the sensor data 148, 152 and score an alarm signal 148b. Each sub-module 510a-510h generates a response 512a-512h (e.g., yes/no) or score (e.g. 1-10) identifying whether a thermal event 62 has been identified by the scoring sub-module 510a-510h. The alarm manager 500 then calculates the alarms score 514 based on the responses 512a-512h or scores generated by each of the scoring sub-modules 510a-510h. For the sake of illustration, the scoring sub-modules 510a-510h are shown as generating binary yes/no responses. However, in other examples, the scoring sub-modules 510a-510h may output scores representing a confidence level of the sub-module 510a-510h that a thermal event 62 is identified. These scores may be evaluated (e.g., summed, averaged) to generate the overall alarm score 514. The responses or scores generated by the sub-modules 510a-510h may be weighted by the alarm scorer 510 to provide greater deference to particular data 148, 152 or sub-modules 510.

Referring still to FIG. 5, the sub-modules 510a-510h include a thermography threshold evaluator 510a that analyzes the thermal imaging data 148a received from the thermography camera 118 to determine whether a magnitude of a measured temperature $T_M$ within the coverage zone 119 exceeds a temperature limit $T_{TE}$. Another sub-module includes the thermography delta evaluator 510b that evaluates a change in temperature over time $\Delta T$ within the coverage zone 119. Thus, the thermography threshold evaluator 510a compares the thermal imaging data 148a against a fixed temperature value while the thermography delta evaluator 510b compares the thermal imaging data 148a against itself over time.

In addition to the thermography sub-modules 510a, 510b, the alarm scorer 510 includes a plurality of optical sub-modules 510c-510e that evaluate the optical data 148e generated by the video camera 116. A first one of the optical sub-modules includes an optical smoke analyzer 510c that evaluates the optical data 148e received from the video camera 116 and determines the presence of smoke. Similarly, an optical light energy monitor 510d analyzes the optical data 148e to determine whether light energy levels are greater than a fixed or historical threshold value for an observation site 60. Where light energy levels exceed the threshold light energy value, the optical light energy monitor 510d determines that a thermal event 62 is present at the observation site 60. Additionally or alternatively, an optical object identifier 510e may execute object identification software to determine whether the optical data 148e includes a fire or smoke object at the observation site 60.

The sub-modules 510a-510h further include environmental or system sub-modules 510f-510h that analyze data 152 received from sensors 150 in the fire suppression system 100 environment. For example, an infrared sensor 510f may be mounted within the fire suppression system 100 remotely from the dispensers. The infrared sensor 510f measures infrared energy within the coverage zone 119 and identifies a presence and/or amount of the infrared energy. The schedule evaluator 510g considers day and time, which may be used to estimate whether the fire suppression system 100 is occupied (e.g., working hours) or vacant (e.g., non-working hours). Additionally or alternatively, an occupancy evaluator 510h may analyze occupancy sensor data 152b to actively monitor whether the fire suppression system 100 environment is occupied or vacant.

Based on the responses and/or scores generated by the sub-modules 510a-510h, the alarm scorer 510 generates an alarm score 510 associated with an alarm signal 148b and transmits the alarm score 514 to the alarm filter 520. The alarm filter 520 then determines an alarm response 522 based on the alarm score 514. The alarm response 522 may include logging the alarm signal 148b as a false alarm where the alarm score 514 does not satisfy a predetermined alarm score threshold. The alarm response 522 may also include instructing the alarm manager 500 to continue evaluating (i.e., scoring) the alarm signal 148b where the alarm score 514 ranges between the first threshold alarm score and a higher second threshold alarm score. In some examples, the alarm response 522 includes forwarding the alarm signal 148b to the user device 20 or automatically initiating the targeting manager 400 to activate one or more of the dispensers 110.

Figure 6:
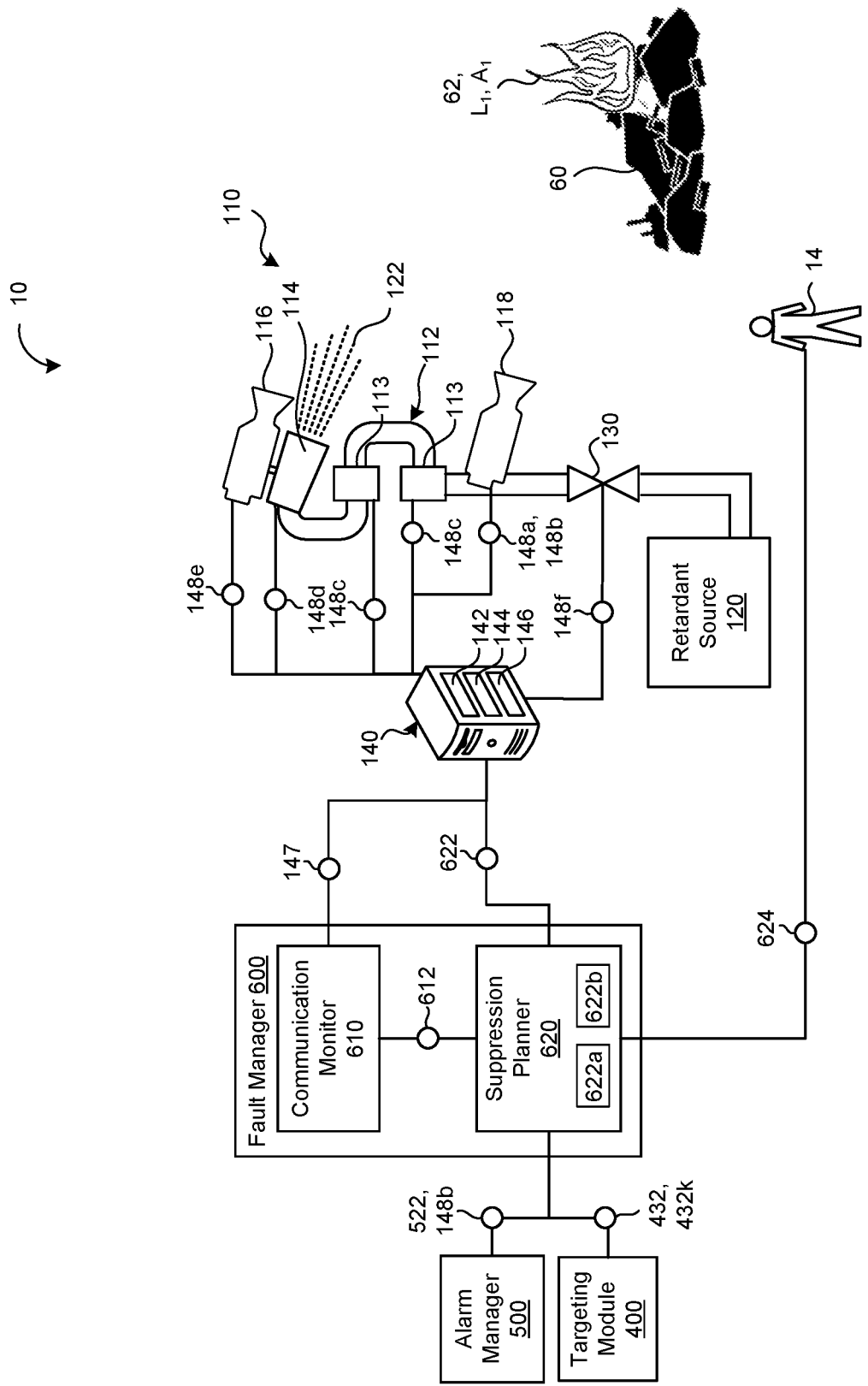
FIG. 6 is a schematic view of an example of a fault manager according to the present disclosure.

Referring to FIG. 6, the fault manager 600 is generally configured to initiate an on-site fire suppression protocol 622 when communication between the fire suppression system 100 and the system control center 12 is inactive. As shown, the fault manager 600 includes a communication monitor 610 that receives a network communication signal 147 from a network switch 146 of the fire suppression system 100 and/or each dispenser 110, and the determines whether the fire suppression system 100 is actively communicating with the network 30, 40 and the system control center 12.

When the communication monitor 610 determines that the fire suppression system 100 or one of the dispensers 110 is disconnected from the network 30, 40, the communication monitor 610 sends a fault signal 612 to the suppression planner 620, which generates instructions 622 for executing a fire suppression protocol. In addition to the fault signal 612, the suppression planner 610 may optionally receive or obtain monitor configurations 432 from the targeting module 400 and/or an alarm response 522 from the alarm manager 500.

When the suppression planner 612 receives the fault signal 612 from the communication monitor 610, the suppression planner 620 determines whether there are any current alarm signals 148b associated with the fire suppression system 100 or dispenser 110. The suppression planner 620 may receive unfiltered alarm signals 148b directly from the dispensers 110 and/or may receive the filtered alarm signals 148b with the alarm response instructions 522 from the alarm filter 520 of the alarm manager 500, as discussed previously. Additionally or alternatively, the suppression planner 620 may receive an alarm verification 624 from an on-site operator 14 via an on-site user device 20, which confirms that a thermal event 62 has occurred.

When the suppression planner 620 confirms a valid alarm signal 148b during a connectivity fault 612, the suppression planner 620 selects or generates a fire suppression protocol 622 with instructions for suppressing the thermal event 62. In some examples, the fire suppression protocol 622 may be a predetermined retardant dispensing pattern. Here, the fire suppression protocol 622 may be a passive protocol 622a that instructs the dispenser 110 to execute the dispensing pattern in a predetermined location of the coverage area 119. For example, an operator 14 may pre-assign observation cite 60 locations within the coverage area 119. Thus, when an alarm signal 148b is received, the passive fire suppression protocol 622a instructs the dispenser 110 to provide retardant 122 to the pre-assigned location(s) of the observation cites 60. This passive protocol 622a allows the fire suppression system 100 to function even in the event where the fault manager 600 is disconnected from the system control center 12 and the other modules 300, 400, 500 of the controller 200, thereby allowing the fire suppression system 100 to function without external control instructions.

Alternatively, the fire suppression protocol 622 may be an active protocol 622b that instructs the dispenser 110 to execute the dispensing pattern in a location of a thermal event 62 identified by the targeting module 400. Thus, as discussed above, the targeting module 400 may select monitor configurations 432 by determining a location L and area A of a thermal event 62. The suppression planner 620 may obtain a monitor configuration 432 corresponding to the time period of the communication fault 612 and the alarm signal 148b and generate the active fire suppression protocol 622b instructing the dispenser to execute the predetermined retardant pattern at the location L.

The fire suppression system 100 of the present disclosure can be used to facilitate expedited fire suppression in remote areas that would otherwise be unfit for certain types of actives or use because of their distance from the municipal fire department. In particular, it is conceivable that the predetermined coverage zone 119 could be located too far away from a local municipal fire department to ensure an adequate response time. Thus, the fire suppression system 100 of the present disclosure affords significant advantages where immediate fire suppression is required to prevent significant property loss, danger the public at large, and/or potentially uncontrollable fire growth/spread. Further, the fire suppression system 100 of the present disclosure affords significant advantages where the predetermined coverage zone 119 encompasses a "high risk," highly flammable, and/or dangerous coverage zone 119. By way of non-limiting example, the fire suppression system 100 of the present disclosure is particularly advantageous when used in connection with the scrap metal processing industry, wherein the coverage zone 119 encompasses one or more highly flammable "fluff piles," which are typically stored outdoors and include waste and/or non-metallic byproducts that are separated out as scrap materials are processed and/or broken down. Irrespective of the application, however, the fire suppression system 100 of the present disclosure significantly improves the detection of fires and, at the same time, facilitates selectively controllable fire extinguishing in an efficient and safe manor.

Figure 7:
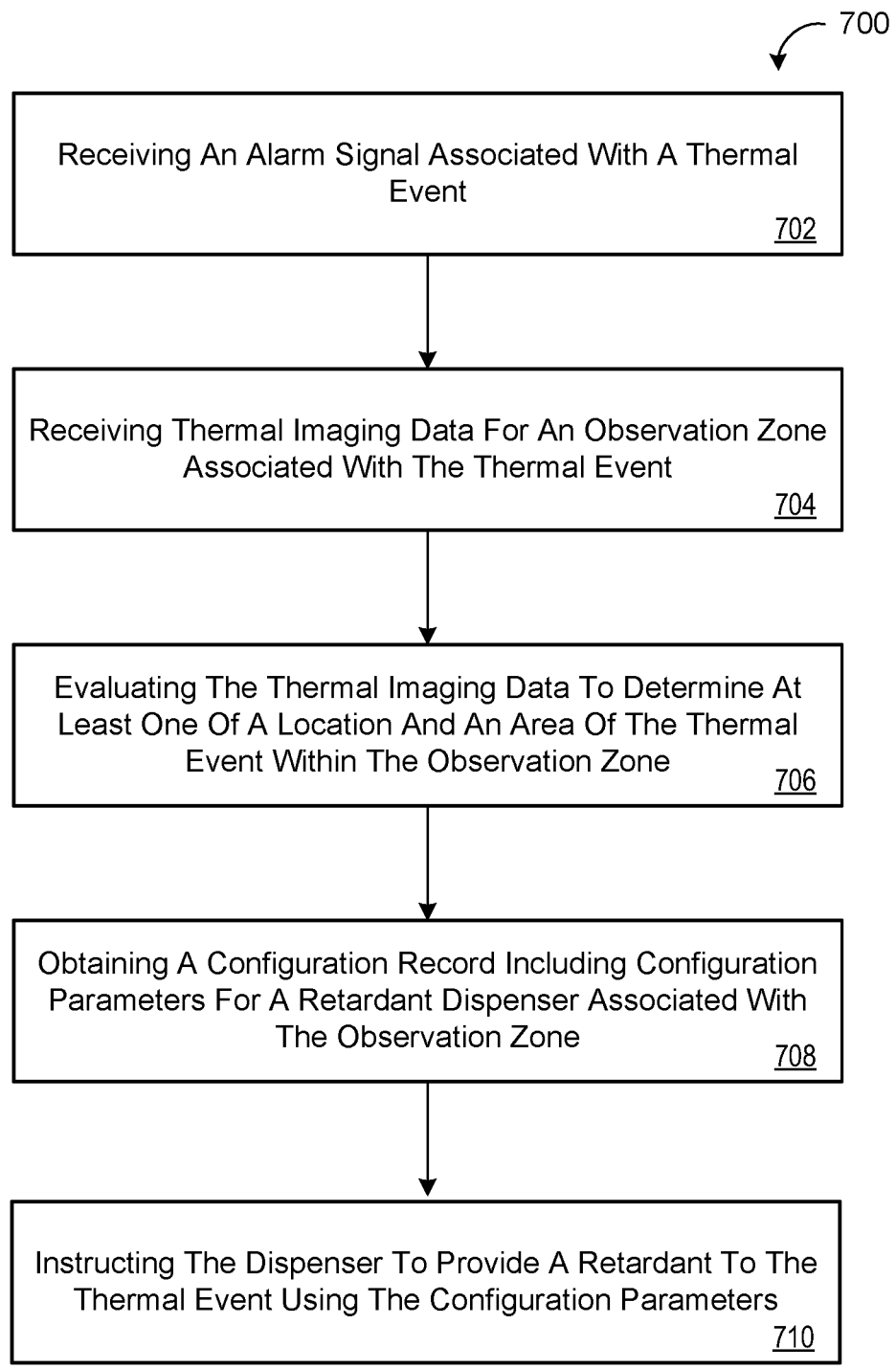
FIG. 7 is a flow diagram of example operations executed by a fire suppression system controller of the present disclosure.

FIG. 7 is a flowchart of operations of an example method 700 according to the present disclosure. In one operation 702, the method includes receiving an alarm signal associated with a thermal event. In another operation 704, the method 700 includes receiving thermal imaging data for an observation zone associated with the thermal event. In another operation 706, the method 700 includes evaluating the thermal imaging data to determine at least one of a location and an area of the thermal event within the observation zone. In another operation 708, the method 700 includes obtaining a configuration record including configuration parameters for a retardant dispenser associated with the observation zone. In another operation, the method 700 includes instructing the dispenser to provide a retardant to the thermal event using the configuration parameters.

Figure 8:
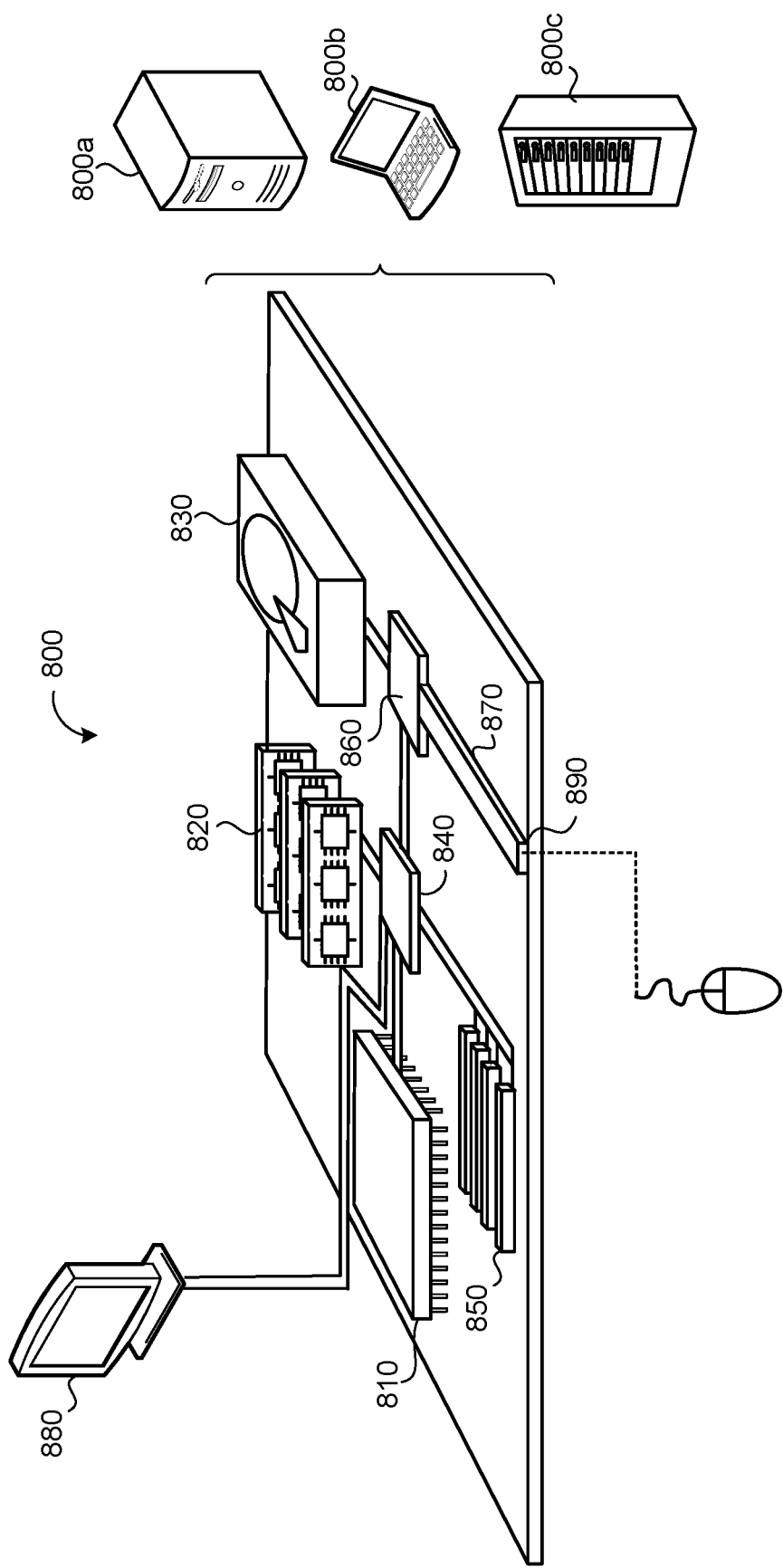
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high-speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method, when executed by data processing hardware of a fire suppression system having a dispenser including an articulable nozzle having one or more articulation actuators, causes the data processing hardware to perform operations comprising:
 receiving an alarm signal associated with a thermal event;
 receiving thermal imaging data for an observation area associated with the thermal event;
 evaluating the thermal imaging data to determine at least one of a location and an area of the thermal event within the observation area;
 in response to determining the at least one of a location and an area of the thermal event, executing an automated lookup operation on a configuration storage, the configuration storage comprising a data structure mapping a plurality of discrete locations and areas within the observation area to a plurality of corresponding predetermined configuration records;
 obtaining a specific configuration record from the lookup operation that corresponds to the determined at least one of a location and an area of the thermal event, the specific configuration record including configuration parameters for the dispenser associated with the observation area, the configuration parameters including a pre-calculated set of actuator and nozzle position parameters; and instructing the dispenser to provide a retardant to the thermal event using the pre-calculated set of actuator and nozzle position parameters from the obtained specific configuration record.

2. The method of claim 1, wherein obtaining the configuration record includes executing a lookup operation based on the at least one of the location and the area of the thermal event and selecting the configuration record associated with the at least one of the location and the area of the thermal event from a configuration storage including predetermined configuration records.

3. The method of claim 1, further comprising:
generating an alarm signal when a temperature within the observation area satisfies an alarm signal temperature threshold;
determining an alarm score for the alarm signal; and
determining an alarm response based on whether the alarm score satisfies one or more alarm score thresholds.

4. The method of claim 3, wherein determining the alarm score comprises:
obtaining optical data for the observation associated with the thermal event;
obtaining environmental data for the observation area; and
evaluating at least two of the thermal imaging data, the optical data, and the environmental data for the observation area;
generating a response or score for the at least two of the thermal imaging data, the optical data, and the environmental data; and
calculating the alarm score based on the responses or scores for the at least two of the thermal imaging data, the optical data, and the environmental data.

5. The method of claim 4, wherein evaluating the optical data includes at least one of determining a presence of smoke, determining a value of light energy, and identifying a fire object.

6. The method of claim 5, wherein evaluating the environmental data includes identifying infrared energy within the observation area independent of the thermal imaging data and determining an occupancy of the observation area based on at least one of (a) considering a day and time and (b) occupancy sensor data for the observation area.

7. The method of claim 6, wherein evaluating the thermal imaging data includes evaluating a temperature magnitude and a temperature change.

8. The method of claim 1, wherein the operations further comprise:
determining a network connectivity status for a fire suppression system; and
instructing a fire suppression system to execute a predetermined fire suppression protocol when the network connectivity status is inactive, wherein the fire suppression protocol includes a predetermined retardant spray pattern.

9. A system comprising:
a dispenser including an articulable nozzle having one or more articulation actuators;
data processing hardware; and
memory hardware in communication with the data processing hardware, the memory hardware storing instructions that when executed on the data processing hardware cause the data processing hardware to perform operations comprising:
receiving an alarm signal associated with a thermal event;
receiving thermal imaging data for an observation area associated with the thermal event;
evaluating the thermal imaging data to determine at least one of a location and an area of the thermal event within the observation area;
in direct response to determining the at least one of a location and an area of the thermal event, executing an automated lookup operation on a configuration storage, the configuration storage comprising a data structure mapping a plurality of discrete locations and areas within the observation area to a plurality of corresponding predetermined configuration records;
obtaining a specific configuration record from the lookup operation that corresponds to the determined at least one of a location and an area of the thermal event, the specific configuration record including configuration parameters for a retardant dispenser associated with the observation area, the configuration parameters including a pre-calculated set of actuator and nozzle position parameters; and
instructing the dispenser to provide a retardant to the thermal event using the pre-calculated set of actuator and nozzle position parameters from the obtained specific configuration record.

10. The system of claim 9, wherein obtaining the configuration record includes executing a lookup operation based on the at least one of the location and the area of the thermal event and selecting the configuration record associated with the at least one of the location and the area of the thermal event from a configuration storage including predetermined configuration records.

11. The system of claim 9, wherein the operations further comprise:
generating an alarm signal when a temperature within the observation area satisfies an alarm signal temperature threshold;
determining an alarm score for the alarm signal; and
determining an alarm response based on whether the alarm score satisfies one or more alarm score thresholds.

12. The system of claim 11, wherein determining the alarm score comprises:
obtaining optical data for the observation area associated with the thermal event;
obtaining environmental sensor data for the observation area;
evaluating at least two of the thermal imaging data, the optical data, and the environmental data for the observation area;
generating a response or score for the at least two each of the thermal imaging data, the optical data, and the environmental data; and
calculating the alarm score based on the responses or scores for the at least two of the thermal imaging data, the optical data, and the environmental data.

13. The system of claim 12, wherein evaluating the optical data includes at least one of determining a presence of smoke, determining a value of light energy, and identifying a fire object.

14. The system of claim 12, wherein evaluating the environmental data includes identifying infrared energy within the observation area independent of the thermal imaging data and determining an occupancy of the observation area based on at least one of (a) considering a day and time and (b) occupancy sensor data for the observation area.

15. The system of claim 12, wherein evaluating the thermal imaging data includes evaluating a temperature magnitude and a temperature change.

16. The system of claim 9, wherein the operations further comprise:
- determining a network connectivity status for a fire suppression system; and
- instructing a fire suppression system to execute a predetermined fire suppression protocol when the network connectivity status is inactive, wherein the fire suppression protocol includes a predetermined retardant spray pattern.

17. A system comprising:
- a dispenser having a monitor including an articulable nozzle having one or more articulation actuators for selectively directing a retardant to a coverage zone, a video camera connected to the monitor and configured to provide optical data of the coverage zone, and a thermographic camera connected to the dispenser and configured to provide thermal imaging data of the coverage zone;
- data processing hardware; and
- memory hardware in communication with the data processing hardware, the memory hardware storing instructions that when executed on the data processing hardware cause the data processing hardware to perform operations comprising:
  - receiving an alarm signal associated with a thermal event;
  - receiving the thermal imaging data for the coverage zone associated with the thermal event;
  - evaluating the thermal imaging data to determine at least one of a location and an area of the thermal event within the coverage zone;
  - in direct response to determining the at least one of a location and an area of the thermal event, executing an automated lookup operation on a configuration storage, the configuration storage comprising a data structure mapping a plurality of discrete locations and areas within the coverage zone to a plurality of corresponding predetermined configuration records;
  - obtaining a specific configuration record from the lookup operation that corresponds to the determined at least one of a location and an area of the thermal event, the specific configuration record including configuration parameters for a retardant dispenser associated with the coverage zone, the configuration parameters including a pre-calculated set of actuator and nozzle position parameters; and
  - instructing the dispenser to provide a retardant to the thermal event using pre-calculated set of actuator and nozzle position parameters from the obtained specific configuration record.

18. The system of claim 17, wherein obtaining the configuration record includes executing a lookup operation based on the at least one of the location and the area of the thermal event and selecting the configuration record associated with the at least one of the location and the area of the thermal event from a configuration storage including predetermined configuration records.

19. The system of claim 18, wherein the operations further comprise:
- generating an alarm signal when a temperature within the coverage zone satisfies an alarm signal temperature threshold;
- determining an alarm score for the alarm signal; and
- determining an alarm response based on whether the alarm score satisfies one or more alarm score thresholds.

20. The system of claim 19, wherein determining the alarm score comprises:
- obtaining the optical data for the coverage zone associated with the thermal event;
- obtaining environmental sensor data for the coverage zone;
- evaluating the thermal imaging data, the optical data, and the environmental data for the coverage zone, wherein (i) evaluating the optical data includes at least one of determining a presence of smoke, determining a value of light energy, and identifying a fire object, (ii) evaluating the environmental data includes identifying infrared energy within the coverage zone independent of the thermal imaging data and determining an occupancy of the coverage zone based on at least one of (a) considering a day and time and (b) occupancy sensor data for the coverage zone, and (iii) wherein evaluating the thermal imaging data includes evaluating a temperature magnitude and a temperature change;
- generating a response or score for each of the thermal imaging data, the optical data, and the environmental data;
- calculating the alarm score based on the responses or scores for the at least two of the thermal imaging data, the optical data, and the environmental data; and
- logging the alarm signal as a false alarm when the alarm score does not satisfy an alarm score threshold and forwarding the alarm signal to a user device or activating the dispenser when the alarm score satisfies the alarm score threshold.

* * * * *